United States Patent [19]

Starace

[11] 4,340,996
[45] Jul. 27, 1982

[54] ADJUSTABLE CABLE CLAMP

[75] Inventor: Jeremia P. Starace, Randolph Township, Morris County, N.J.

[73] Assignee: Bell Telephone Laboratories, Incorporated, Murray Hill, N.J.

[21] Appl. No.: 106,004

[22] Filed: Dec. 21, 1979

[51] Int. Cl.³ .................. B65D 63/02; H01R 5/02; A44B 21/00
[52] U.S. Cl. .................. 24/20 R; 24/20 TT; 24/23 EE; 24/255 SL; 24/263 R; 339/47 R; 248/74 R
[58] Field of Search ............. 24/20 R, 20 TT, 20 EE, 24/115 R, 263 R, 265 R, 265 H, 17 A, 271, 339, 255 SL; 248/74 R, 488; 403/344; 174/40 CC, 156; 339/47 R

[56] References Cited

U.S. PATENT DOCUMENTS

| | | | |
|---|---|---|---|
| 573,685 | 12/1896 | Munro | 24/263 R |
| 771,312 | 10/1904 | Koehler | 24/115 R |
| 1,528,106 | 3/1925 | Gocke et al. | 24/263 R |
| 2,696,962 | 12/1954 | Goss | 248/488 |
| 2,796,648 | 6/1957 | Peterson | 339/47 R |
| 2,915,267 | 12/1959 | Kaysing | 24/265 H |
| 3,027,128 | 3/1962 | Liberty | 248/74 R |
| 3,229,998 | 1/1966 | Pennington | 24/255 SL |
| 3,295,806 | 1/1967 | Modeme | 24/265 H |
| 3,517,981 | 6/1970 | Rueger et al. | 24/265 R |
| 3,757,031 | 9/1973 | Izraeli | 24/255 SL |
| 3,914,831 | 10/1975 | Steinberg | 24/265 AL |

FOREIGN PATENT DOCUMENTS

| | | | |
|---|---|---|---|
| 221618 | 6/1962 | Austria | 24/263 R |
| 1010603 | 6/1957 | Fed. Rep. of Germany | 174/40 CC |

Primary Examiner—Victor N. Sakran
Attorney, Agent, or Firm—R. O. Nimtz

[57] ABSTRACT

An adjustable clamp (10) comprising a pair of substantially identical clips (15) is employed to align and retain a plurality of members, typically cables, in a stiff, planar arrangement to facilitate manipulation. Each clip comprises a ratcheting detail (41) on one of its legs (40) and a slotted beam (33) on the other of its legs (30). The slotted leg from one clip slidably engages and adjustably interlocks with the ratchet mechanism of the other clip to form a coupling arrangement which binds cables in the interstice of the clamp.

5 Claims, 3 Drawing Figures

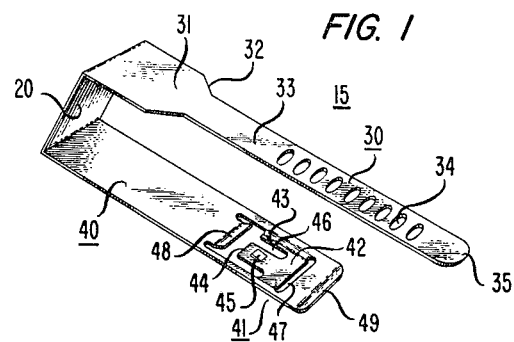
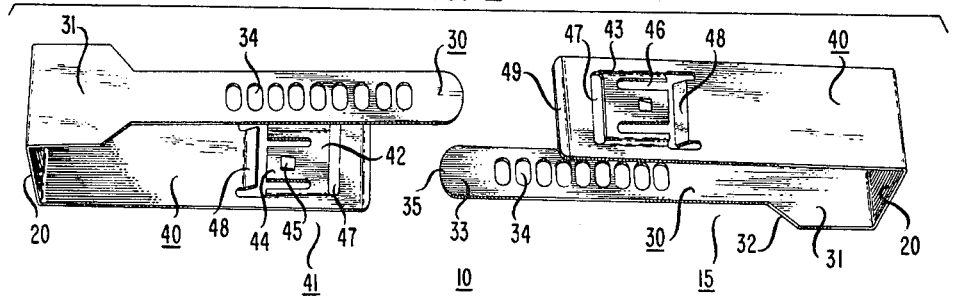
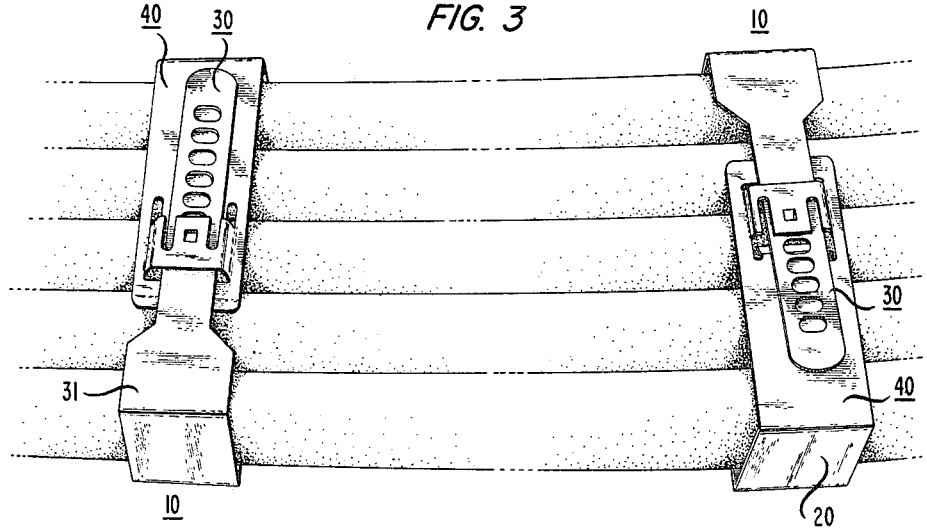

ADJUSTABLE CABLE CLAMP

BACKGROUND OF THE INVENTION

1. Field of the Invention

This invention relates generally to a cable clamp and, more particularly, to an adjustable two-part clamp for aligning and retaining a plurality of cables in a planar arrangement.

2. Description of the Prior Art

In telephone system cabling applications, particularly those associated with the main distribution frame, efficient cable management and routing techniques, as well as accompanying apparatus, are required to effectively utilize the space allocated to the numerous multipair cables. The cables typically originate from and thereafter terminate at a myriad of spaced-apart locations. To mitigate crisscrossing of bulky cables and avoid cumbersome pileups, a number of prior art routing techniques, with accompanying hardware, have been devised.

One early solution to avoid pileups was that of providing individual cable racks to align the cables in generally side-by-side fashion in a single layer. Additional racks utilized in a spaced-apart, stacked relation increased cabling capability. One obvious shortcoming of such an arrangement is the inefficient utilization of central office space. Another deficiency is the fixed location of the racking apparatus which is inflexible and unnecessarily increases the lengths of cable runs.

The latest of the conventional racking arrangements is a modified version of the earlier arrangement and, therefore, possesses all the inherent shortcomings as discussed above. With this modified version, a bottom or base rack accepts the first layer of cables, again arranged in side-by-side manner. Additional racking layers are constructed, in ladder-like fashion, from piece parts comprising stanchion-like supports and interlocking crossmembers. When supported and retained by the assembly, the cables cannot be shifted to prevent crossovers and, also, cable pileup increases due to the stacking, at the same points, of the piece parts. However, this arrangement has proved useful in the past because racking space has been decreased by reducing the interrack separation.

As discussed in more detail shortly, the subject matter of the present invention discloses a cable clamp that has been designed to: (i) mitigate cable pileup in a base rack by aligning and retaining two or more cables in a board-like arrangement to maintain an even level of cables across the rack; (ii) eliminate cable crosses by providing a freely movable cable form to allow stacking and shifting of cable groups; and (iii) reduce space requirements and installation costs by limiting tie-down points to the rack.

Since the subject matter of the present invention involves means for clamping cables, other pertinent prior art relates to clamping devices. Representative of this prior art is the device disclosed in U.S. Pat. No. 3,295,806, issued to R. Modeme on Jan. 3, 1967. The Modeme invention relates to a two-part clip for attaching a single cylindrical member to a fixed support. The clip basically comprises a base portion and an attaching portion to draw the cylindrical member to the base; both piece parts are substantially dissimilar in construction. This clip exhibits a number of shortcomings and limitations. Foremost is the inability to bind together more than one member, whether cylindrical, oblong or even square. Also, the clip of Modeme is not adjustable and cannot accommodate a varying size or number of interposed members. Finally, the clip tends to be more expensive and difficult to manufacture due to the dissimilarity in construction of the piece parts.

SUMMARY OF THE INVENTION

These and other shortcomings, limitations and deficiencies of the pertinent prior art are obviated with the present invention of an adjustable cable clamp utilized to align and retain a plurality of cables in a stiff, board-like arrangement and thereby facilitate manipulation and rack mounting. The clamp comprises a pair of substantially identical, U-shaped clips. Each clip is generally formed from a unitary piece of resilient material and has a ratcheting detail on one leg and numerous slots on the other leg. Two juxtaposed clips, each having its ratcheting leg adjacent the slotted leg of the other clip, slidably engage and resiliently interlock to form a coupling arrangement which binds cables between the U-shaped openings of the juxtaposed clips.

One feature of the cable clamping device in accordance with the present invention is the ability to distort and reshape the interposed multipair cables, which are generally circular in cross section, by deforming the cables with a compressive force so as to fill the interstice of the clips. This is accomplished by applying a force to the clips so as to drive the ratchet legs onto the slotted legs a distance sufficient to distort the cables. This feature allows, for example, five cables each having a nominal diameter of 1.03 inches to be compressed into a rectangular cross-sectional area that is approximately 1 inch by 4.7 inches (as contrasted to an area of 1.03 inches by 5.15 inches for free form cable). The space saving by such an arrangement is readily apparent.

In addition, even though the cables are retained and bound in a planar fashion, relative displacement between pairs of cables is not completely precluded so that the bound cables can be formed to traverse bends and similar obstacles.

Other features and advantages of the present invention will be apparent hereinafter from a detailed description of the invention and the appended claims taken in conjunction with the attached drawing of an illustrative embodiment.

BRIEF DESCRIPTION OF THE DRAWING

FIG. 1 depicts one of the symmetrical clips comprising the clamp in side perspective view;

FIG. 2 depicts the two clips comprising the clamp in side perspective view. Each clip has its ratchet leg adjacent the slotted leg of the other clip so that the clips are prepared for slidable engagement; and FIG. 3 shows, in a pictorial fashion, the adjustable clamp binding five cables in a planar arrangement.

DETAILED DESCRIPTION

In the embodiment of the invention illustrated in the drawing, FIG. 1 depicts one clip 15 from the pair of identical clips comprising adjustable cable clamp 10 (FIG. 3), which is shown opened and ready for use in the side perspective view of FIG. 2. The structure as well as the operation of cable clamp 10 will be set forth in the following detailed description.

With reference to FIG. 1, cable clip 15 is preferably fashioned from a unitary piece of thin, elongated, resilient material, such as metal. The material is formed so that clip 15 is generally U-shaped and comprises wall 20, slotted leg 30 and ratchet leg 40. Both legs 30 and 40 are substantially perpendicular to wall 20, and both project in the same lateral direction from wall 20. The distance between the parallel running legs 30 and 40 is approximately equal to the nominal diameter of the cables to be clamped. Leg 30 is generally longer than leg 40; the reason for this is presented below. The overall length of clip 15 is chosen according to the individualized requirements of the application. For example, to accommodate 1-inch diameter cables, a unitary piece of material 1/32×1×8.3 inches is formed into clip 15 such that: leg 30 is about 4 inches long; leg 40 is about 3.15 inches long; and the separation between legs 30 and 40 (inner height of wall 20) is approximately 1 inch.

Slotted leg 30 comprises base portion 31, taper 32 and slotted beam 33 all integrally formed, via an operation such as stamping, from the resilient material prior to its restructuring into the U-shape. Taper 32 provides for a gradual transition in width between the unaltered width of base 31 and the narrower width of beam 33. This narrower width relative to the rest of clip 15 is required to adapt beam 33 for slidable engagement with ratchet leg 40, which is formed from the full width of the resilient material. A number of substantially identical apertures 34, oblong in shape, are formed in beam 33 in side-by-side fashion along its length; the longer dimensional sides of apertures 34 are perpendicular to the length dimension of beam 33. Tip 35 of beam 33 is rounded at its corners to facilitate the insertion of beam 33 into ratchet mechanism 41 of leg 40.

Ratchet leg 40 has ratchet mechanism 41 formed proximate to its free end, also through a stamping operation or the like prior to reshaping. Mechanism 41 comprises: shoulders 43, outwardly directed from beam 33, of height approximately equal to the thickness of the resilient material and arranged parallel to the length of leg 40 for about one-fourth its length; and platform 42 resting on the outwardly directed edges of shoulders 43, being of the same length as shoulders 43 and arranged parallel to the plane containing leg 40.

Platform 42 has two U-shaped apertures 46 formed proximate to its shoulder edges. Apertures 46 have their U-shaped edges parallel to the length of leg 40 and are formed to a depth of about three-quarters of the length of platform 42. The protruding portion of platform 42, between apertures 46, defines flexible finger 44, having a width about one-third the width of leg 40. Raised, ramp-shaped nub 45 is formed in finger 44. Nub 45 is inwardly directed, towards beam 33, and its front face is rectangularly-shaped when looking along the bottom of leg 40 as viewed from wall 20. The bottom of its front face rests on the plane containing the bottom surface of leg 40. Slot 47 runs along the back edge of platform 42, the edge nearest the free tip of leg 40.

During a clamping operation, referring now to FIG. 2, tip 35 from right clip 15 is initially inserted into slot 47 of left clip 15 so that right beam 33 slides between the top surface of left platform 42 and the bottom surface of left leg 40. Tongue 49, at the free end of leg 40, is inwardly directed along the front edge of left leg 40 and serves to guide tip 35 from the right clip 15 along the bottom surface of left leg 40. As right beam 33 is urged into mechanism 41, flexible finger 44 of left clip 15 is depressed by the contact of nub 45 with beam 33. As tip 35 reaches the other side of platform 42, left raised guide 48, formed by an upward bend in the laterally-directed surface of leg 40 opposite slot 47, directs tip 35 back onto the bottom surface of left leg 40. As right beam 33 continues its clamping motion, nub 45 collapses into the first of right apertures 34 and thereby aligns left resilient finger 44 to be parallel with left legs 30 and 40. It is now impossible to retract beam 33 from mechanism 41, without the aid of an extraction tool, because the front surface of left nub 45 abuts the material forming the front surface of the first right aperture 34. Continued urging of beam 33 into mechanism 41 causes the material separating the first and second apertures to again depress finger 44, by sliding along ramped-shaped nub 45, until nub 45 collapses into the void of the second of apertures 34. Again, retraction is impractical without a tool.

While this operation is proceeding with one ratchet-slot detail associated with ratchet leg 40 of left clip 15 and slotted leg 30 of right clip 15, the identical operation is proceeding with the other ratchet-slot detail. Two clips 15 are continuously urged together about a plurality of interposed members until walls 20, ratchet legs 40 and slotted legs 30 align and retain the interposed members. The appropriate pair of nubs 45 seat in an oppositely aligned pair of apertures 34 so as to form a stiff, board-like arrangement of interposed members.

Slotted leg 30 is longer than ratchet leg 40 so that leg 30 may conveniently serve as an extraction tool. Two other clips 15 have their slotted legs 30 inserted, in a direction opposite to the usual orientation, under the ratchet locking mechanisms 41 of clamp 10, and the interlocked clips 15 may then be pulled apart.

The distance between the narrow end of taper 32 and the last of apertures 34 (the one closest taper 32) is generally greater than the distance between nub 45 and tongue 49. Because of this arrangement, tip 35 does not protrude past wall 20, and a generally rectangular cross section obtains for all adjustment positions.

It is to be further understood that the adjustable cable clamp described herein is not limited to specific forms disclosed by way of example or illustration but may assume other forms, materials or dimensions limited only by the scope of the appended claims.

I claim:

1. A clamping device comprising a pair of clips, each of said clips being U-shaped and having laterally disposed first and second legs
   characterized by
   a rachet mechanism and slotted beam mechanism formed, respectively, with said first and second legs, said beam mechanism from each one of said clips adapted to slidably interlock with said ratchet mechanism from the other of said clips, said rachet mechanism including
      a pair of spaced-apart, laterally disposed shoulders,
      a platform joined to said shoulders and oriented in a parallel relation to said first leg, said platform being partially cut away to form a laterally disposed flexible finger, and
      a raised nub arranged on said finger for grasping said slotted beam.

2. The device as recited in claim 1 wherein said ratchet mechanism further comprises
   an inwardly-directed, transversely-disposed tongue, located at the tip of said first leg, for guiding said slotted beam into said ratchet mechanism, and
   an inwardly-directed, transversely-disposed deflector, located adjacent to said finger, for guiding said slotted beam along the outer surface of said first leg.

3. The device as recited in claim 2 wherein each one of said clips is formed from a unitary piece of resilient material.

4. The device as recited in claim 3 wherein the length of said second leg exceeds the length of said first leg.

5. The device as recited in claim 4 wherein said second leg tapers from a narrow portion at its free end to a base portion, said narrow portion having elongated, laterally-spaced apertures forming said slots, with the distance between said taper and the last of said apertures being greater than the distance between said nub and said tongue to provide a generally rectangular cross-section whenever said nub registers in any of said slots.

* * * * *